US009158821B1

(12) United States Patent
Quisel et al.

(10) Patent No.: US 9,158,821 B1
(45) Date of Patent: Oct. 13, 2015

(54) SYSTEM AND METHOD FOR OPTIMIZING INTERACTIONS BETWEEN USERS IN A NETWORK ENVIRONMENT

(71) Applicant: MATCH.COM, L.L.C, Dallas, TX (US)

(72) Inventors: Tom R. Quisel, New York, NY (US); Sam D. Yagan, Chicago, IL (US)

(73) Assignee: MATCH.COM, L.L.C., Dallas, TX (US)

( * ) Notice: Subject to any disclaimer, the term of this patent is extended or adjusted under 35 U.S.C. 154(b) by 200 days.

(21) Appl. No.: 13/742,650

(22) Filed: Jan. 16, 2013

(51) Int. Cl.
*G06F 17/30* (2006.01)

(52) U.S. Cl.
CPC .................................. *G06F 17/3053* (2013.01)

(58) Field of Classification Search
CPC ............................. G06F 19/16; G06F 17/3053
USPC .................... 707/723, 999.006, E17.089, 722
See application file for complete search history.

(56) References Cited

U.S. PATENT DOCUMENTS

| | | | | |
|---|---|---|---|---|
| 6,272,467 | B1 * | 8/2001 | Durand et al. | 705/5 |
| 6,321,224 | B1 * | 11/2001 | Beall et al. | 1/1 |
| 6,480,885 | B1 * | 11/2002 | Olivier | 709/207 |
| 7,502,787 | B2 * | 3/2009 | Bailey et al. | 1/1 |
| 7,882,039 | B2 * | 2/2011 | Weiss et al. | 705/319 |
| 7,917,448 | B2 * | 3/2011 | Smola et al. | 705/319 |
| 7,996,428 | B2 * | 8/2011 | Neal | 707/793 |
| 8,521,823 | B1 * | 8/2013 | Sheinberg et al. | 709/206 |
| 8,566,327 | B2 * | 10/2013 | Carrico et al. | 707/748 |
| 2006/0059147 | A1 * | 3/2006 | Weiss et al. | 707/6 |
| 2006/0059159 | A1 * | 3/2006 | Truong et al. | 707/10 |
| 2009/0164464 | A1 * | 6/2009 | Carrico et al. | 707/5 |
| 2009/0322597 | A1 | 12/2009 | Medina-Herrero et al. | |
| 2010/0246576 | A1 | 9/2010 | Bustamente | |
| 2010/0283827 | A1 | 11/2010 | Bustamente | |
| 2010/0285856 | A1 | 11/2010 | Thomas | |
| 2010/0287286 | A1 | 11/2010 | Bustamente | |
| 2011/0313647 | A1 | 12/2011 | Koebler et al. | |
| 2012/0296991 | A1 * | 11/2012 | Spivack et al. | 709/206 |
| 2014/0040368 | A1 * | 2/2014 | Janssens | 709/204 |
| 2014/0074824 | A1 * | 3/2014 | Rad et al. | 707/722 |
| 2014/0114965 | A1 * | 4/2014 | Balduzzi et al. | 707/723 |

OTHER PUBLICATIONS

Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).
Zoosk Customer Support, "How Do I Video Chat?" available online at <URL https://zoosk.zendesk.com/entries/20513017-how-do-i-video-chat> Oct. 7, 2011 (3 pages).

* cited by examiner

*Primary Examiner* — Debbie Le
(74) *Attorney, Agent, or Firm* — Patent Capital Group

(57) ABSTRACT

A method is provided in one example embodiment and includes establishing a pool of potential matches for a user in a computer-implemented matching system, in which each of the potential matches meet at least one criteria of the user; determining a messaging score for each of the potential matches of the pool, the messaging score indicating a messaging aptitude of the potential match; and ranking the potential matches, where each of the potential matches is ranked based on a similarity of the messaging score of the potential match to a messaging score of the user. In one embodiment, the method may further include presenting to the user results of the ranking.

16 Claims, 12 Drawing Sheets

FIG. 2H match.com close window

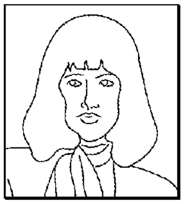

LadyDi520

Active within 24 hours New

Basics

"Looking for my Knight in Shining Armor"

| | |
|---|---|
| I am a: | 32 yr old woman |
| located in: | Dallas, Texas, United States |
| looking for: | Dating: 32 to 45-year old man within 25 miles of Dallas metroplex, Dallas, Texas, United States |
| relationships: | Currently separated |
| my ethnicity: | White / Caucasian |
| body type: | Slender |
| height: | 5' 4" (162.6 cms) |
| sense of humor: | Clever: Nothing's better than a quick-witted comeback, Friendly: I'll laugh at anything |
| sign: | Cancer |

About me and who I'd like to meet

I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!!

Appearance

| | |
|---|---|
| height: | 5' 4" (162.6 cms) |
| eyes: | Green |
| hair: | Auburn / Red |
| body type: | Slender |
| body art: | Belly button ring |
| best feature: | Chest |

Interests for fun:

I love to have a good time at whatever I am doing. I love to laugh I love to smile and I am looking for that someone that can make that happen, it hasn't for a LONG time.

TO FIG. 2I

FIG. 2I

FROM FIG. 2H favorite hot spots:
I love Olive Garden (cheap date) LOL then karaoke, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule sense of humor: Clever: Nothing's better than a quick-witted comeback, Friendly: I'll laugh at anything sports and exercise: No Answer common interests: Cooking, Dining out, Movies/Videos, Music and concerts, Watching sports

Lifestyle exercise habits: Don't exercise
daily diet: Meat and potatoes
smoke: Daily
drink: Social drinker, maybe one or two
job: Other profession
I am a bartender right now, I used to be a medical secretary but got tired of the 9-5 taking a break
income: $25,001 to $35,000
my place: Live with pets
have kids: Yes, and they live away from home
how many: 3
want kids: No Answer
pets:
I have: Dogs, Fish
I don't have, but like: Cats
I don't like: Reptiles, Birds, Exotic pets, Gerbils / Guinea Pigs / Etc., Fleas, Other

Background / Values ethnicity: White / Caucasian
faith: Christian / Other
education: Some college
Ohio State for 2 years

TO FIG. 2J

FIG. 2J

FROM FIG. 2I

| | |
|---|---|
| languages: | English |
| politics: | Conservative |

About My Date

| | |
|---|---|
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |

Fun

Boot scootin' across gritty floorboards, the band playing what we'll soon remember as "our song"

Photos

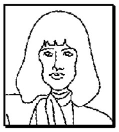

SYSTEM AND METHOD FOR OPTIMIZING INTERACTIONS BETWEEN USERS IN A NETWORK ENVIRONMENT

TECHNICAL FIELD

This disclosure relates in general to the field of communications and, more particularly, to a system and a method for optimizing interactions between users in a network environment.

BACKGROUND

Communications network architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In the case of an online dating service, for example, an end user will typically be prompted to specify a variety of preferences to be used in matching the end user with other end users in the particular online dating service community. This specification may be accomplished by the end user responding to questions designed to elicit explicit preferences of the end user or by the end user rating a variety of qualities on a scale of very important to not at all important, for example. The end user may also be presented with an opportunity to identify "deal breakers;" that is, characteristics or behaviors that if possessed or engaged in by a potential match render that person immediately and irredeemably undesirable. Additionally, the end user may be presented with the opportunity to specify certain "must haves," which are the opposite of deal breakers; in particular, they are characteristics or behaviors a potential match should possess or engage in to even be considered by the end user. The information each end user provides about him or herself may be viewed by other end users in the online community in determining whether to interact with that end user.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-J are simplified screen shots of an example protocol for participating in an on-line dating service in accordance with one embodiment of the present disclosure;

DETAILED DESCRIPTION OF EXAMPLE EMBODIMENTS

Overview

A method is provided in one example embodiment and includes establishing a pool of potential matches for a user in a computer-implemented matching system, wherein each of the potential matches meet at least one criteria of the user; determining a messaging score for each of the potential matches of the pool, the messaging score indicating a messaging aptitude of the potential match; and ranking the potential matches, wherein each of the potential matches is ranked based on a similarity of the messaging score of the potential match to a messaging score of the user. In one embodiment, the method may further include presenting to the user results of the ranking. The method may further include time-weighting interactions comprising the messaging score.

In a particular embodiment, the messaging score for each of the potential matches comprises a weighted combination of a number of three way interactions initiated by the potential match and an average number of three way interactions initiated by other users having a similar age and the same gender as the potential match the messaging score for each of the potential matches comprises a weighted combination of a number of messages sent and received by the potential match and a number of messages sent and received by other users having a similar age and the same gender as the potential match.

Additionally, the method may further include further comprising determining a match factor for each of the potential matches, wherein each of the potential matches is ranked based on a weighted combination of the match factor thereof and the similarity of the messaging score of the potential match to the messaging score of the user. Still further, the method may include determining an attractiveness factor for each of the potential matches, wherein each of the potential matches is ranked based on a weighted combination of a similarity of the attractiveness factor of the potential match and an attractiveness factor of the user and the similarity of the messaging score of the potential match to the messaging score of the user.

In a particular embodiment, the criteria used in establishing the pool includes a selected one of a group of criteria, the group consisting of a gender that is specified in a particular profile of the user; an ethnicity that is specified in a particular profile of the user; a religion that is specified in a particular profile of the user; an age range that is specified in a particular profile of the user; a location that is specified in a particular profile of the user; an education level that is specified in a particular profile of the user; and one or more personal habits that are specified in a particular profile of the user. The method may also include offering a subscription to a website-based service in exchange for a fee, wherein the website is configured to provide one or more results associated with the ranking of the set of like profiles.

EXAMPLE EMBODIMENTS

Figure 1:
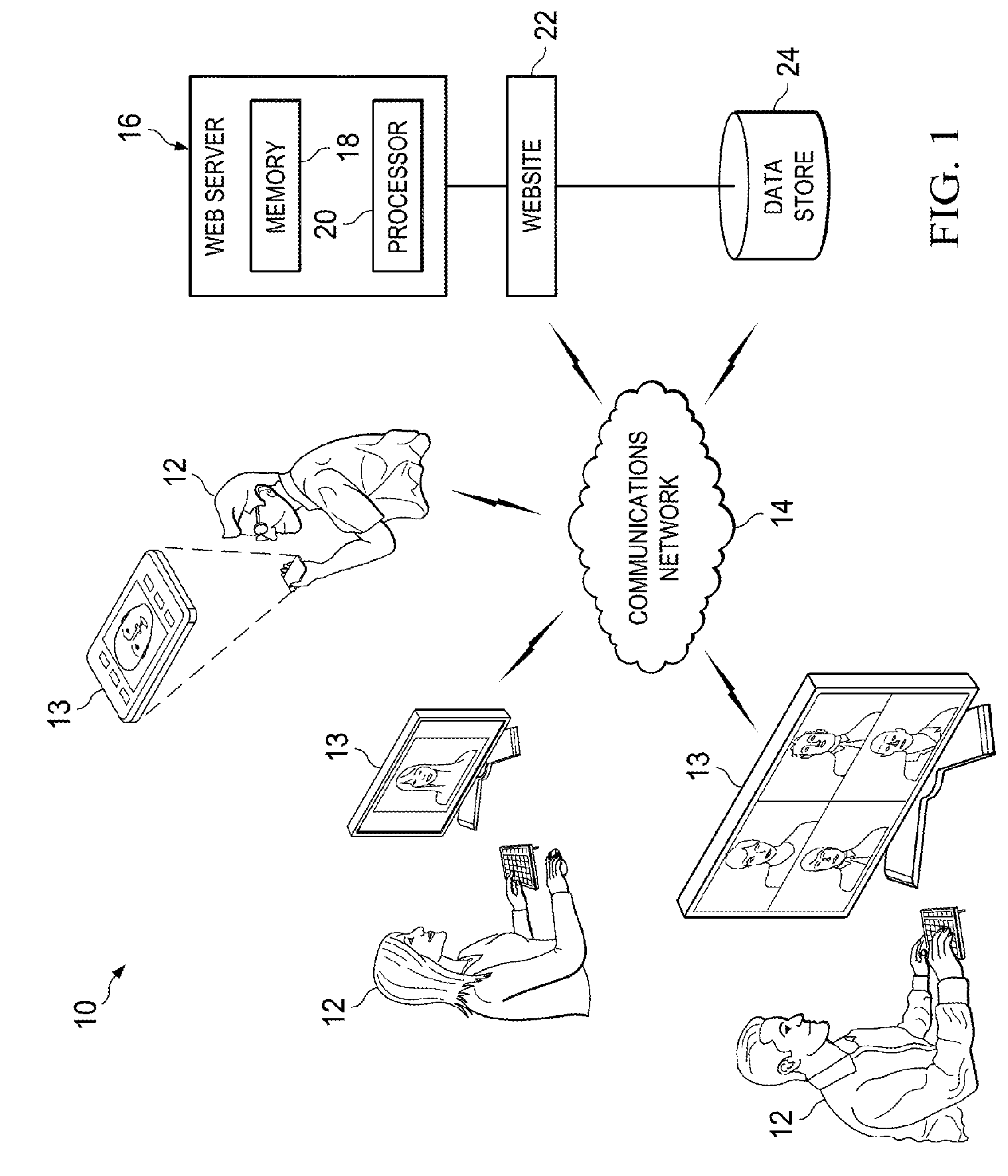
FIG. 1 is a network diagram showing an operating environment of the present disclosure in accordance with one embodiment of the present disclosure.

FIG. 1 is a simplified block diagram of a system for facilitating an online dating scenario in a network environment. In other embodiments, communications, or matching, system 10 can be leveraged to identify and to evaluate suitable candidates in other areas (e.g., hiring/employment, recruiting, real estate, general person searches, etc.). FIG. 1 includes multiple end users 12 and endpoints 13, a communications network 14, a web server 16 comprising memory 18 and a at least one processor 20, a website 22, and a data store 24. The data store 24 may be any type of mechanism for storing data, including but not limited to one or more files, databases, memory devices, mass storage devices, data centers, etc. In system 10, users 12 interact with the web server 16 via endpoints 13, each of which comprises an appropriate user interface for interacting with the web server 16 via the website 22 for facilitating functions and features described herein. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10. Ancillary components to such a comprehensive process may involve pre-date profiles, post-date follow-ups, and a myriad of other significant features, some of which are outlined in greater detail below.

End users 12 may include a variety of types of end users, such as clients, customers, prospective customers, or entities wishing to participate in an online dating scenario and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data, as used herein in this document, refers to any type of numeric, voice, video, or script data, or any other suitable information in any appropriate format that may be communicated from one point to another. End users 12 may access the aforementioned data via endpoints 13, which may be inclusive of devices used to initiate a communication, such as a computer, a personal digital assistant (PDA), a laptop or electronic notebook, a cellular telephone, an IP telephone, an iPhone, an iPad, a Microsoft Surface, a Google Nexus, or any other device, component, element, or object capable of initiating voice, audio, or data exchanges within communication system 10. Endpoints 13 may also be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

End user 12 may employ any device capable of operating as an endpoint 13 to connect to communications network 14 via wire, wireless, cellular, satellite link or other suitable interfaces. Web server 16, which as previously noted includes memory 18 and at least one processor 20, hosts website 22 and has access to transmit and receive user or presence data (e.g., user profile data, user and/or user endpoint data, user contact data) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate actions associated with finding a potential match candidate. Alternatively, communications network 14 could be a plain old telephone system (POTS), which end user 12 could use to perform the same operations or functions. Such transactions may be assisted by management associated with website 22 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a server that is operable to receive and to communicate information to end user 12. Alternatively, web server 16 may be any switch, router, gateway, processor, component, object, or element operable to facilitate communications involving end user 12. In one particular embodiment, web server 16, via interaction with database 24 and provision of website 22, is engaged in facilitating interaction(s) between parties interested in seeking a romantic partner (i.e., online dating). For example, website 22 can be online dating service provider www.Match.com, www.Chemistry.com, or any other suitable provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from member end users. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
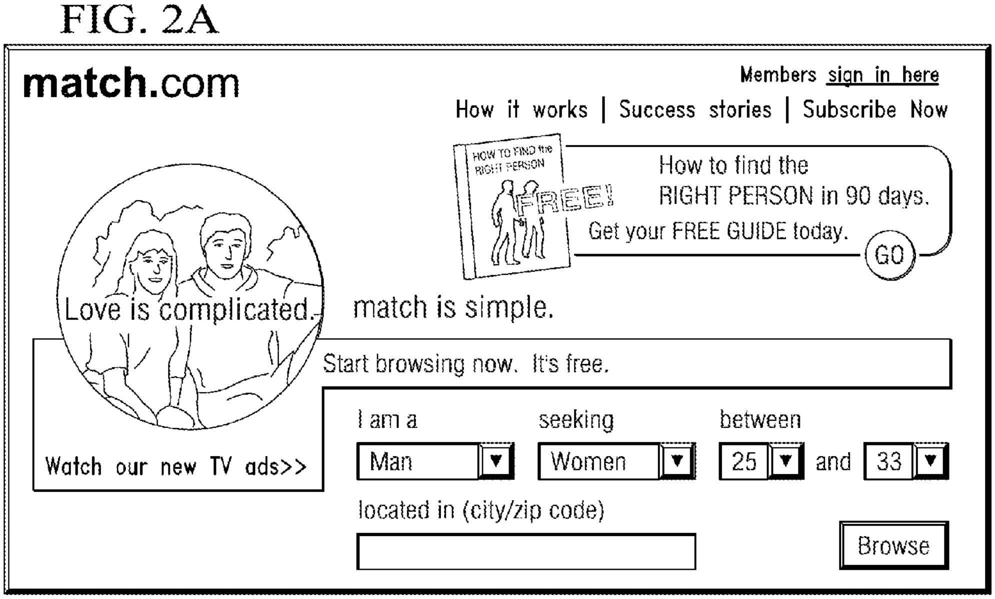
Figure 2B:
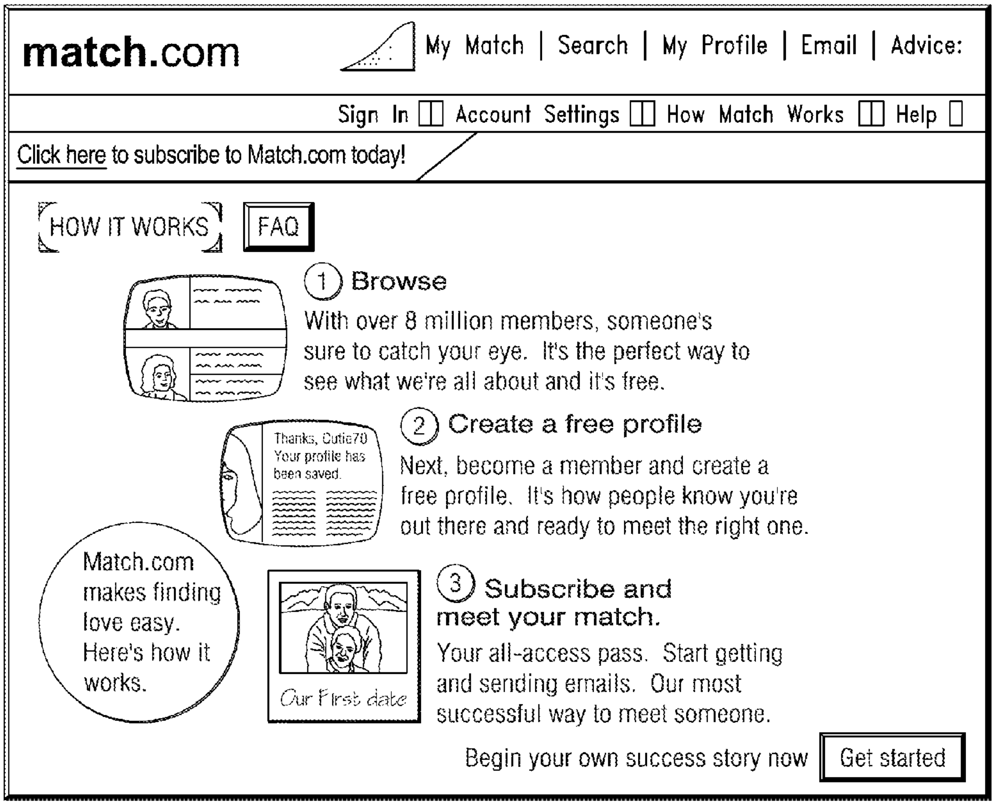

FIG. 2A is an example screen shot of a home page from which an interested end user may begin his/her journey. In the illustrated example, the home page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the home page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view pictures of members along with summaries of the members' profiles. After browsing the website, the end user may decide to create a free profile. Once the end user browses the website and creates a profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male named "Tom" who is interested in finding a female match.

Figure 2C:
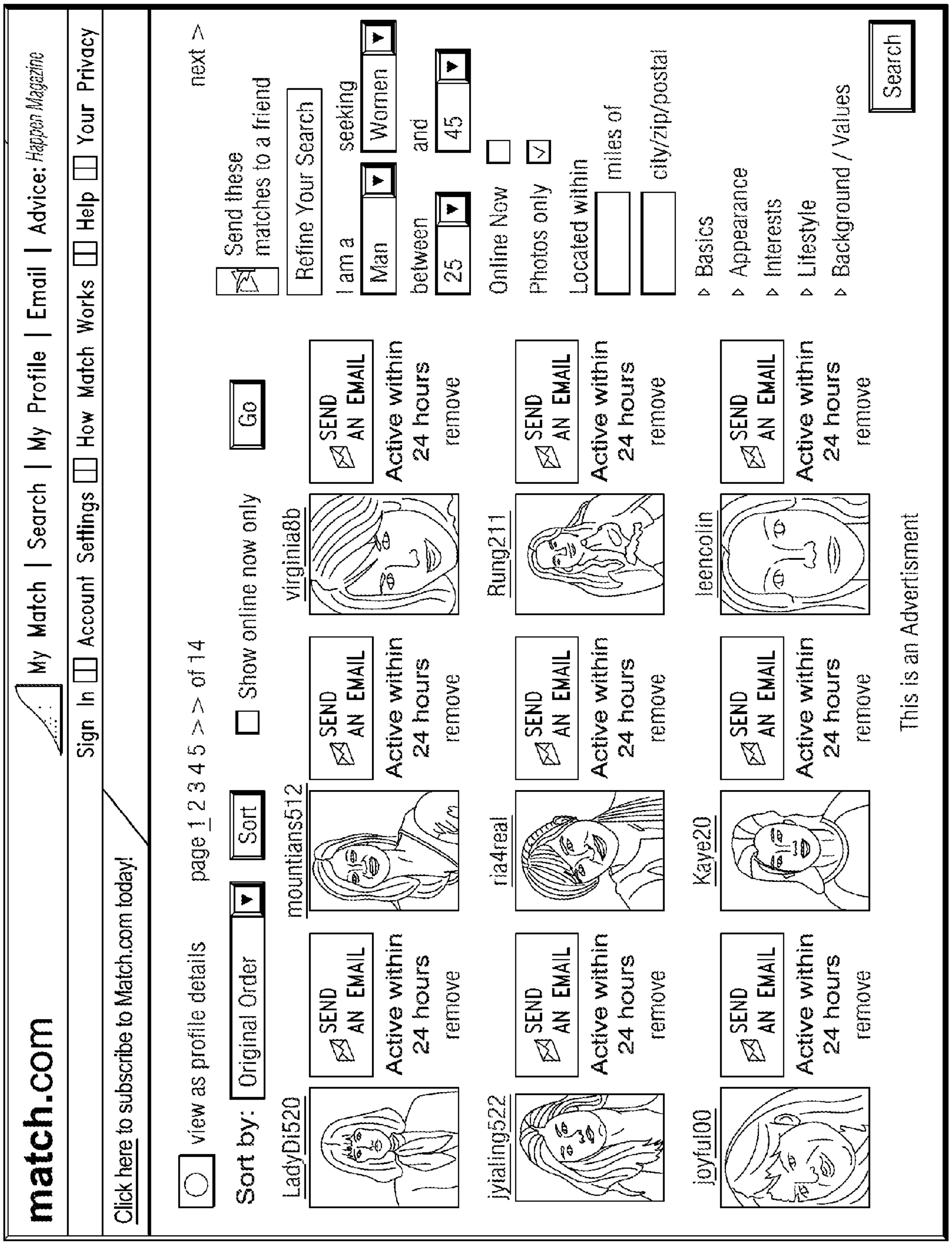
Figure 2D:
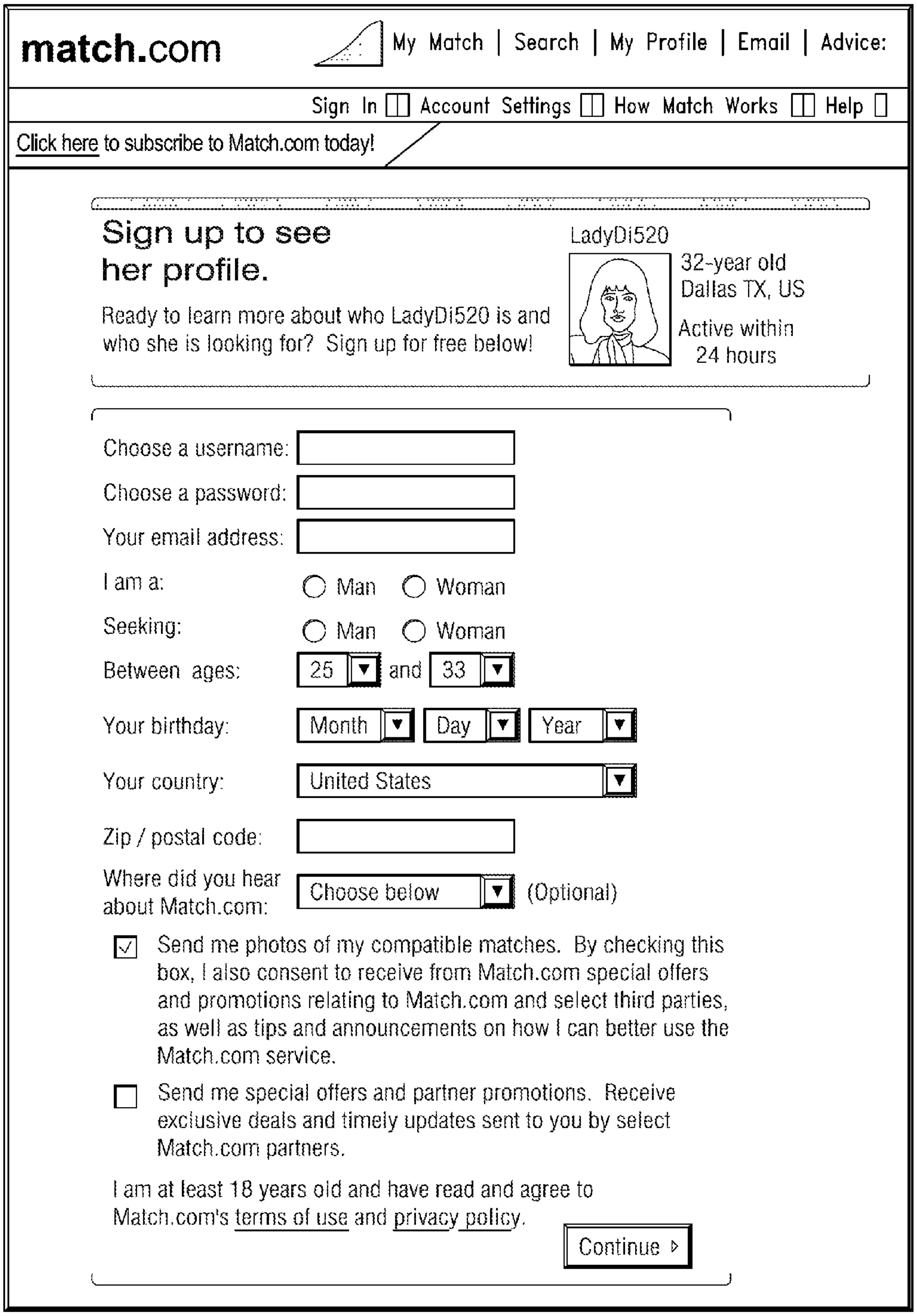

FIG. 2C is an example screen shot of a number of profiles that may be viewed by Tom during the browsing phase described above. In the context of this shot, Tom may be simply browsing. Assuming Tom has decided he would like to know more about one of the members whose profile is presented in FIG. 2C, he may click on the picture associated with the selected profile. For example, assuming Tom has decided he would like more information about "LadyDi520", clicking on her picture results in his being directed to a web page as shown in FIG. 2D, where he is solicited to sign up for the online dating subscription such that he can effectively contact his candidate selection. It will be noted that the information solicited using the page shown in FIG. 2C may be used in selecting matches for Tom. The information may also be displayed on Tom's profile or summary thereof presented to other users to assist those users in determining whether they are interested in interacting with him.

Figure 2E:
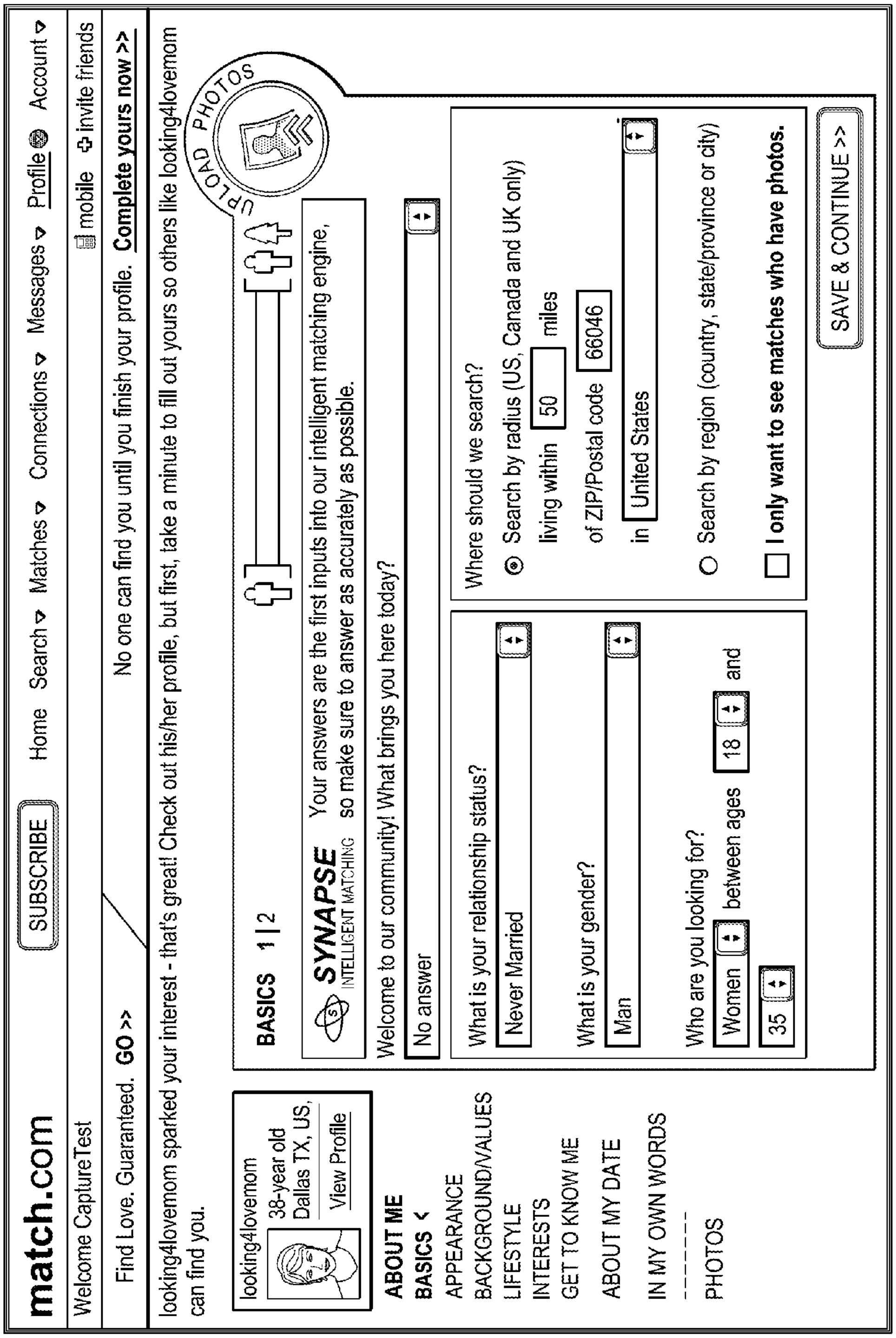
Figure 2F:
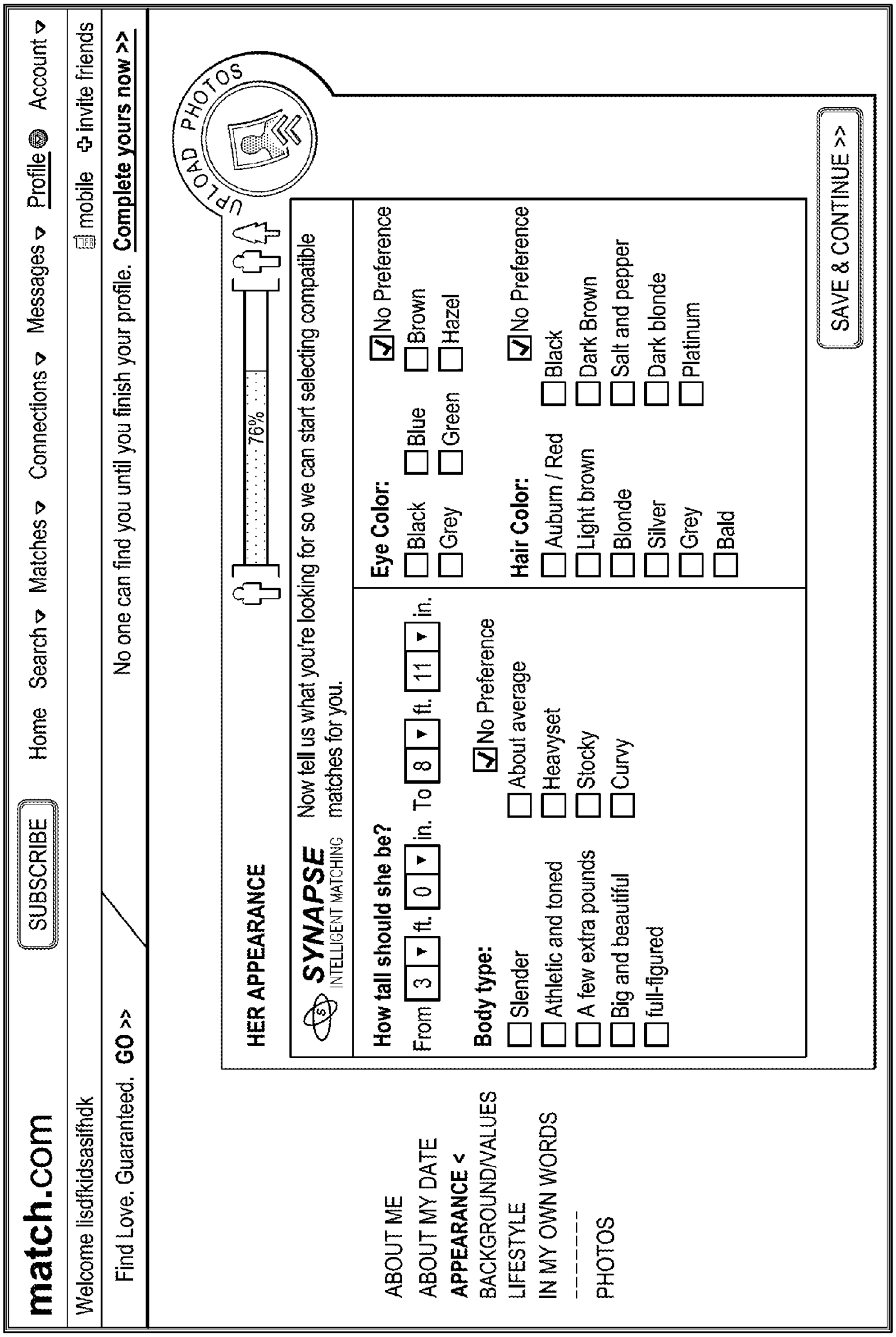
Figure 2G:
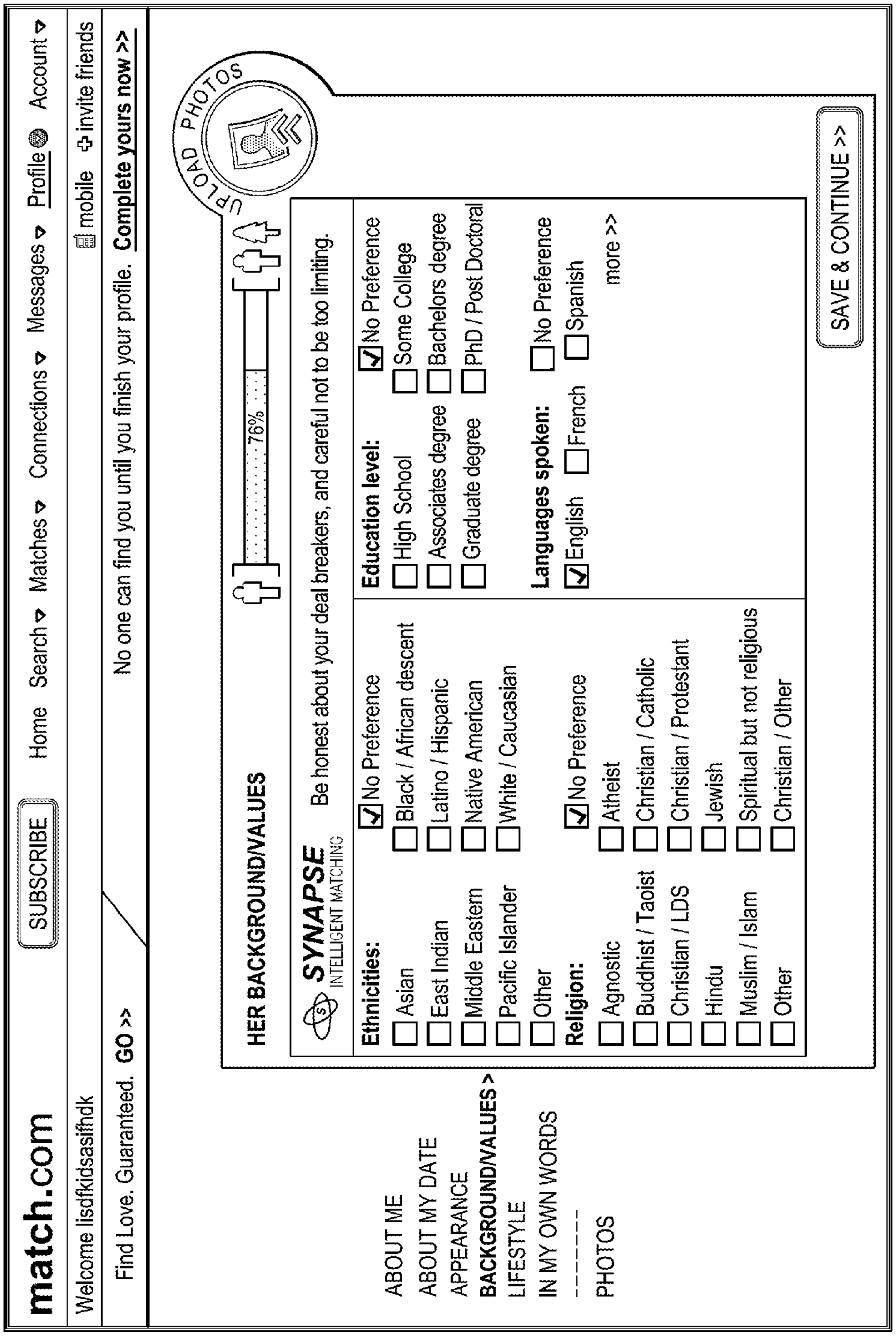

FIGS. 2E-2G illustrate various screen shots comprising a user information collection process in accordance with one embodiment. Using the web pages illustrated in FIGS. 2E-2G, system 10 collects a variety of information from an end user, including, but not limited to, basic information about the end user (FIG. 2E), as well as information about the type person the end user would be interested in dating, including information about a potential date's physical appearance (FIG. 2F) and background and values (FIG. 2G). It will be recognized that the information collected using the web pages illustrated in FIGS. 2E-2G is illustrative only and that any type/amount of information may be solicited in the illustrated manner.

FIGS. 2H-J are example screen shots of the full profile of LadyDi520, the picture Tom selected while browsing. In illustrated profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include a photo, biographical information (e.g., gender, age, location, relationship status, etc.), physical information (e.g. Height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

The matching activities illustrated and described herein take into account a variety of factors in selecting matches for an end user. Some of those factors can be explicitly identified by the end user, other factors can be based on actions of the user, and still others can be based on cumulative actions of other users in the system. In one embodiment described herein, another factor that may be considered in prioritizing, or sorting, match results comprising potential matches for an end user is the extent to which the end user and matches have similar habits with regard to interacting with other users in the system.

Figure 3:
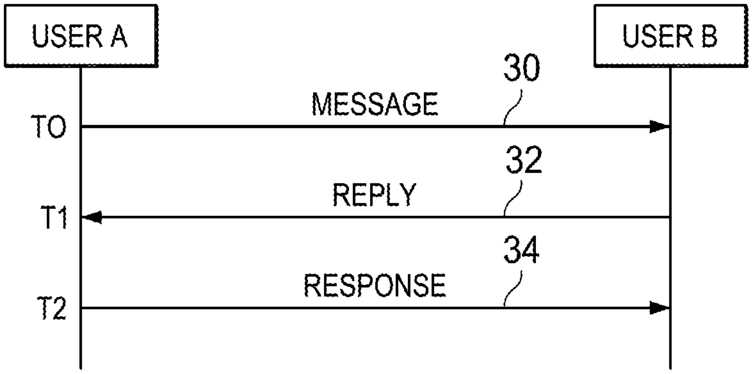
FIG. 3 illustrates an example of a three way interaction between two users in accordance with one embodiment of the present disclosure.

FIG. 3 illustrates an example interaction between two users, respectively designated UserA and UserB. Although it will be assumed for the sake of example that the interactions described in FIG. 3 are email interactions, interactions may include any type of interaction enabled, supported, or detectable by the system, including, but not limited to, emailing, instant messaging ("IMing"), winking at, favorably rating, and designating as a favorite the profile of another user.

Referring again to FIG. 3, in the example illustrated therein, communication between UserA and UserB, who sends a message 30 to UserB via the system at a time T0. A period of time later, at a time T1, UserB sends a reply 32 to UserA. Some time period later, at a time T2, UserA sends a response 34 to UserB's reply 32. Time T1 may be seconds, minutes, hours, or even days, for example, after time T0. Similarly, time T2 may be seconds, minutes, hours, or even days, for example after time T1. The message-reply-response interaction between UserA and UserB as illustrated in FIG. 3 will hereinafter be referred to herein as a "three way interaction." UserA is the "initiator" of the three way interaction illustrated in FIG. 3. UserB is the "recipient" of the three way interaction illustrated in FIG. 3.

In one embodiment, a messaging score ("MS") is computed for all users in the system. In general, a user's MS is an indication of how interactive the user is on the system, in terms of both quantity (i.e., how many interactions the user initiates), as well as quality (i.e., how willing participants of interactions initiated by the user are to respond). For example, a user may email many other users in the system, making him highly interactive in terms of quantity of interactions initiated; however, a low level of response to the user's emails may be indicative of a low level of quality as gauged by other users. Similarly, failure by the user to respond to a reply by another user to his or her email (i.e., to complete a three way communication that the user initiated) may also indicate that the first user is not actually interested in or particularly adept at interacting with other users.

In one embodiment, a user's MS may be calculated using the following equation:

MS=(prior_weight*prior(age, gender)+score_weight*raw_score)/(prior_weight+score_weight)

where score_weight is the total number of initiations sent or received by the user; raw_score is the total number of three ways in which the user was involved divided by the total number of initiations the user sent; prior_weight is the average score_weight for other active users of the same age and gender as the user; and prior (age, gender) is the average raw_score for active users of the same age and gender as the user. In this manner, as described above, MS takes into account not only the quantity but also the perceived quality of the user's interactions with other users in the system.

It will be recognized that when a user first registers with the system, he or she will have no messaging history upon which to base his or her MS; however, certain attributes of a user have been found to correlate well with the user's MS. In one embodiment, this correlation may be used to predict with relative accuracy a user's MS before the user even begins sending messages. In particular, gender and age correlate highly with a user's messaging quality, so the average messaging quality for users of the same gender and in the same age group as a target user can be averaged and used as an initial "best guess" for the target user's messaging quality, or MS. The next challenge is cross-fading between the initial best guess and the estimate based on the target user's messaging history, once the target user begins to send messages. Specifically, the MS may be entirely based on the best guess when a user has no messaging history and may be based entirely on the user's actual messaging history when such history is well established.

In the middle ground between those two extremes (i.e., no messaging history and extensive messaging history), Bayesian inference is used to fill in the blanks. In particular, treating the user's MS as estimated from his messaging history as normally distributed justified by the central limit theorem, the prior estimate can be represented as a beta distribution with the variance of the distribution controlled by the average number of messages sent by other users in the target user's group (age and gender) and the mean of the distribution is equal to the mean MS for users in the target user's group (age and gender). This reduces to the simple linear weighting between prior score (prior(age, gender)) and the target user's messaging history score (raw_score), as set forth in the above equation. Intuitively, this means that when a target user has not done much messaging on the system, their MS is mostly comprised of the prior score (prior(age, gender)). As the target user messages more, his or her MS is increasingly determined by his or her own messaging history. Weighting the prior_score by the average amount of messaging in the target user's group (age and gender) means that for users who tend to send fewer messages, their messaging history data will be trusted more readily. This is desirable, since it is expected that less data will be available from those users as time goes on, so rapid use should be made of any data obtained.

Figure 4:
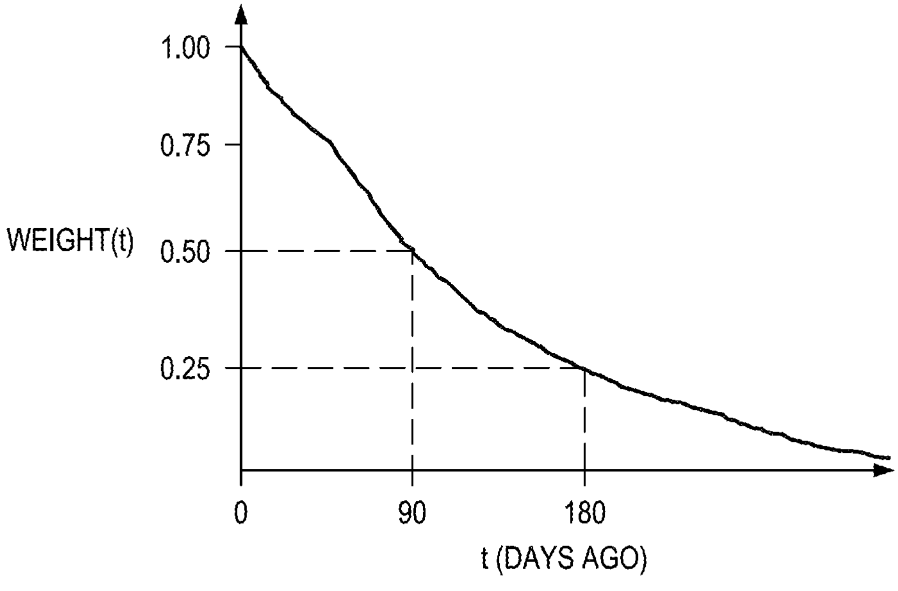
FIG. 4 is a graph of a messaging score weight over time in accordance with one embodiment of the present disclosure.

In one embodiment, interactions by the user factored into score_weight and raw_score may be time weighted in accordance with the following equation, as illustrated in FIG. 4:

$$\text{weight}(t)=e^{-t/90\ days}$$

In this manner, a user's past behavior as it relates to interactivity on the system counts less (either for or against the user) than the user's more recent behavior; as a result, trends in the user's interactive behavior can be captured in his/her MS. For example, if the user "used to" be a poor initiator but more recently has become a more active initiator, the user's MS would be higher than if the user had exactly the same types/number of interactions with other users in the system but used to be a more active initiator and has recently become a poorer initiator. In other words, "old" behavior has less of an effect (positive or negative) on a user's MS than "new" behavior.

Figure 5:
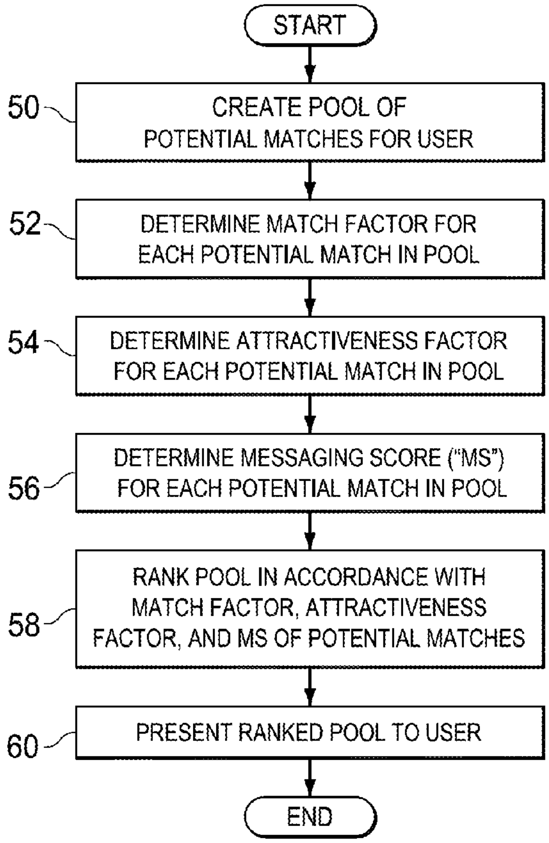
FIG. 5 is a flow diagram illustrating logic implemented by an intelligent matching feature of one embodiment of the present disclosure.

FIG. 5 is a flowchart illustrating logic implemented by an intelligent matching feature of one embodiment. In one embodiment, the logic for implementing the intelligent matching feature (potentially to be embodied in software) could be provided in web server 16. In step 50, a match pool is developed for a user using a match selection process. In one embodiment, the user may have initiated the match selection process. The match selection process may be performed using one of any number of known processes. In one embodiment, the match pool is limited to a certain number of potential matches. After the match pool is developed in step 50, the potential users in the pool are ranked, or prioritized, in order of projected appeal to the user. Several factors may be considered in determining relative priority of the potential matches in the match pool and performing the ranking. For example, the more similarly matched the potential match and the user are, perhaps in terms of what qualities each is looking for as compared to the qualities of the other, the higher the priority of the potential match. Accordingly, in step 52, a "match factor," which may simply comprise an indication of the rank of each potential match in terms of how sell the potential match corresponds to the user's stated preferences, is determined for each potential match. For example, although two potential matches in the match pool may be similar enough to the user's preferences to have been included in the pool in step 50, a first potential match may be a 99% match, whereas a second potential match may be a 95% match; therefore, the first potential match will have a higher match factor than the second potential match.

Similarity of attractiveness between the potential matches and the user may also be considered, with potential matches whose attractiveness level is similar to the user being ranked higher than those whose attractiveness level is less similar. Accordingly, in step 54, an "attractiveness factor," comprising an indication of similarity of attractiveness between a potential match and the user, is determined for each potential match. For example, assuming the user has an attractiveness rating of 15 on a scale of 1-20 based on some "objective" rating procedure, a particular potential match that has an attractiveness rating of 8 would likely not be as good a match for the user as one who has been given an attractiveness rating of 14, 15, or 16. Similarly, a potential match that has been given an attractiveness rating of 20 would also not be as good a match for that user. Accordingly, with respect to a user that has an attractiveness rating of 15, a potential match that also has an attractiveness rating of 15 will have a higher attractiveness factor than a potential match that has an attractiveness rating of 12.

In accordance with features of one embodiment, the respective MSes of the user and potential matches are also considered. Accordingly, in step 56, an MS is determined for each of the potential matches. For reasons previously noted, in general, the more similar a potential match's MS is to the user's MS, the more likely the potential match is to be a good match and the more highly ranked the potential match will be in the user's list of match results. Similarly, the less similar the potential match's MS is to the user's MS, the less likely the potential match is to be a good match for the user and the lower the potential match will be in the user's list of match results. An exception to this generality arises in a situation in which one the user is new to the system and the potential match has a high MS or vice versa. This exception is due to the fact that a new user likely has not had sufficient time to establish an accurate MS; therefore, to penalize him or her for a low MS, which may not ultimately accurately reflect the user's interactiveness.

It will be recognized that steps 52-56 need not be performed in the order illustrated in FIG. 5; on the contrary, the steps may be interchanged or two or more of the steps may be performed concurrently. Moreover, one or more of the steps may be omitted or augmented or replaced by a step comprising determination of some other relevant factor. Once the match factor, attractiveness factor, and MS are determined for each of the potential matches in the pool, in step 58, the potential matches are ranked in accordance with a weighted consideration of each of the factors/scores. It will be recognized that a variety of "equations" may be used in combining the factors/scores to determine a final ranking for each of the potential matches. For example, in some embodiments, messaging aptitude may be considered more important than attractiveness similarity; in such an embodiment, the MS would be weighted more heavily than the attractiveness factor in ranking potential matches. Similarly, in some embodiments, similarity of attractiveness may be the most important quality in which case the attractiveness factor would be weighted more heavily than the match factor and the MS. In step 60, a ranked list of potential matches is presented to the user. For example, this list may be presented on a display of the user's computer, emailed to him or her, or even faxed to him or her. In one embodiment, the method of presentation is selectable by the user.

The matching activities illustrated and described herein take into account a variety of factors in selecting matches for an end user. Some of those factors can be explicitly identified by the end user; other factors can be based on actions of the user, and still others can be based on cumulative actions of other users in the system. Some of the steps illustrated in the preceding FIGURES may be changed or deleted where appropriate and additional steps may also be added to the process flows. These changes may be based on specific communication architectures or particular interfacing arrangements and configurations of associated elements and do not depart from the scope or the teachings of the present disclosure. It is important to recognize that the FIGURES illustrate just one of a myriad of potential implementations of system 10.

As previously noted, "Interactions" may include the user's emailing, winking at, favorably rating, or designating as a favorite the profile of another user. It should also be noted that such interactions can take any suitable form. For example, the interactions can be facilitated by website 22 (e.g., through an e-mail platform, through a voice over IP (VoIP) technology, through a session initiation protocol (SIP), through instant messaging, through any type of mobile communications (inclusive of texting), etc.). Additionally, interactions can be performed through any suitable third-party technology (e.g., interactions involving 9 framework, a Twitter account, a Tumblr account, etc.). Some of these interactions can be facilitated directly by website 22 (e.g., provided as some sort of service as part of a subscription model), provided by an external third-party protocol, or provided in conjunction with some type of partnership involving website 22 and the external third-party protocol.

Figure 6:
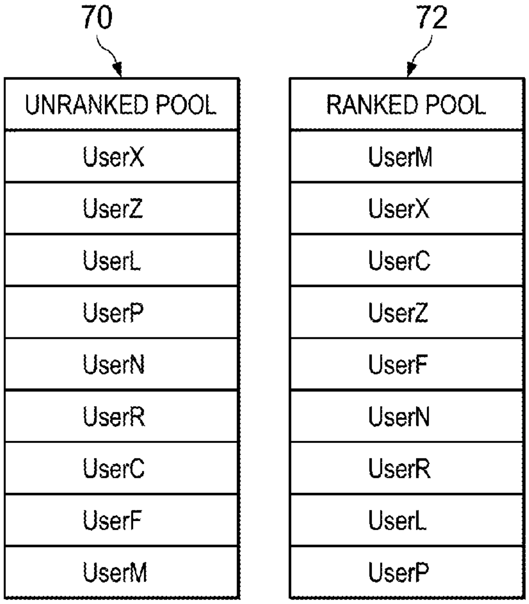
FIG. 6 illustrates an unranked pool of potential matches and a ranked pool of potential matches in accordance with features of one embodiment of the present disclosure.

FIG. 6 illustrates an example list 70 comprising an unranked pool of potential matches for a user, which may comprise a list developed in step 50 of the flowchart shown in FIG. 5, and a list 72 comprising the same potential matches listed in list 70 after they have been ranked in accordance with embodiments described herein (e.g., such as that illustrated in FIG. 5).

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in any aspect of the online dating process described herein, such as establishing a personality profile, for example, any suitable question format can be employed. Example formats include a Yes/No format, a multiple choice question format, a short answer format, a true/false format, etc. Other formats can readily be used in order to achieve the desired responses and solicit the necessary data.

Note that in certain example implementations, the matching functions outlined herein, such as those carried out by the match generator of web server 16 and/or provided as an application for an endpoint being operated by an end user, may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:

establishing a pool of potential matches for a user in a computer-implemented matching system, wherein each of the potential matches meet at least one criteria of the user;

determining a messaging score for each of the potential matches of the pool, the messaging score indicating a messaging aptitude of the potential match; and ranking the potential matches, wherein each of the potential matches is ranked based on a similarity of the messaging score of the potential match to a messaging score of the user;

wherein the messaging score for each of the potential matches comprises a combination of at least one of a number of three way interactions initiated by the potential match as compared to an average number of three way interactions initiated by other users having a similar age and same gender as the potential match, a number of messages sent by the potential match as compared to an average number of messages sent by other users having a similar age and same gender as the potential match, and a number of messages received by the potential match as compared to an average number of messages received by other users having a similar age and same gender as the potential match.

2. The method of claim 1 further comprising presenting to the user results of the ranking.

3. The method of claim 1 further comprising time-weighting interactions comprising the messaging score.

4. The method of claim 1 further comprising determining a match factor for each of the potential matches, wherein each of the potential matches is ranked based on a weighted combination of the match factor thereof and the similarity of the messaging score of the potential match to the messaging score of the user.

5. The method of claim 1 further comprising determining an attractiveness factor for each of the potential matches, wherein each of the potential matches is ranked based on a weighted combination of a similarity of the attractiveness factor of the potential match and an attractiveness factor of the user and the similarity of the messaging score of the potential match to the messaging score of the user.

6. The method of claim 1, wherein the criteria comprise a selected one of a group of criteria, the group consisting of:

a) a gender that is specified in a particular profile of the user;

b) an ethnicity that is specified in a particular profile of the user;

c) a religion that is specified in a particular profile of the user;

d) an age range that is specified in a particular profile of the user;

e) a location that is specified in a particular profile of the user;

f) an education level that is specified in a particular profile of the user; and g) one or more personal habits that are specified in a particular profile of the user.

7. The method of claim 1, further comprising:

offering a subscription to a website-based service in exchange for a fee, wherein the website is configured to provide one or more results associated with the ranking of the set of like profiles.

8. Logic encoded in one or more non-transitory tangible media that includes code for execution and when executed by a processor is operable to perform operations comprising:

establishing a pool of potential matches for a user in a computer-implemented matching system, wherein each of the potential matches meet at least one criteria of the user;

determining a messaging score for each of the potential matches of the pool, the messaging score indicating a messaging aptitude of the potential match; and ranking the potential matches, wherein each of the potential matches is ranked based on a similarity of the messaging score of the potential match to a messaging score of the user;

wherein the messaging score for each of the potential matches comprises a combination of at least one of a number of three way interactions initiated by the potential match as compared to an average number of three way interactions initiated by other users having a similar age and same gender as the potential match, a number of messages sent by the potential match as compared to an average number of messages sent by other users having a similar age and same gender as the potential match, and a number of messages received by the potential match as compared to an average number of messages received by other users having a similar age and same gender as the potential match.

9. The logic of claim 8, the operations further comprising presenting to the user results of the ranking.

10. The logic of claim 8, the operations further comprising time-weighting interactions comprising the messaging score.

11. The logic of claim 8, the operations further comprising determining a match factor for each of the potential matches, wherein each of the potential matches is ranked based on a weighted combination of the match factor thereof and the similarity of the messaging score of the potential match to the messaging score of the user.

12. The logic of claim 8, the operations further comprising determining an attractiveness factor for each of the potential matches, wherein each of the potential matches is ranked based on a weighted combination of a similarity of the attractiveness factor of the potential match and an attractiveness factor of the user and the similarity of the messaging score of the potential match to the messaging score of the user.

13. An apparatus, comprising:

a server that includes a processor and a memory, wherein the apparatus is configured to:

establish a pool of potential matches for a user in a computer-implemented matching system, wherein each of the potential matches meet at least one criteria of the user;

determine a messaging score for each of the potential matches of the pool, the messaging score indicating a messaging aptitude of the potential match; and rank the potential matches, wherein each of the potential matches is ranked based on a similarity of the messaging score of the potential match to a messaging score of the user;

wherein the messaging score for each of the potential matches comprises a combination of at least one of a number of three way interactions initiated by the potential match as compared to an average number of three way interactions initiated by other users having a similar age and same gender as the potential match, a number of messages sent by the potential match as compared to an average number of messages sent by other users having a similar age and same gender as the potential match, and a number of messages received by the potential match as compared to an average number of messages received by other users having a similar age and same gender as the potential match.

14. The apparatus of claim 13, wherein the server is further configured to present to the user results of the ranking.

15. The apparatus of claim 13, wherein the server is further configured to determine a match factor for each of the potential matches, wherein each of the potential matches is ranked based on a weighted combination of the match factor thereof and the similarity of the messaging score of the potential match to the messaging score of the user.

16. The apparatus of claim 13, wherein the server is further configured to determine an attractiveness factor for each of the potential matches, wherein each of the potential matches is ranked based on a weighted combination of a similarity of the attractiveness factor of the potential match and an attractiveness factor of the user and the similarity of the messaging score of the potential match to the messaging score of the user.

* * * * *